July 8, 1969
W. NESTLER
3,454,815
INDIRECTLY HEATED DISPENSER CATHODE FOR
ELECTRICAL DISCHARGE TUBES
Filed July 5, 1966
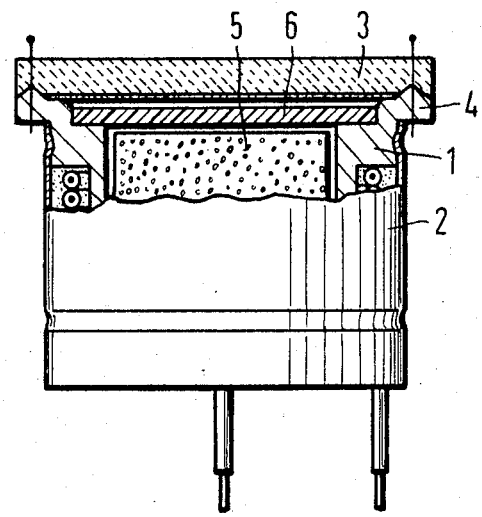
INVENTOR
WOLFGANG NESTLER
BY
ATTORNEYS 3,454,815
INDIRECTLY HEATED DISPENSER CATHODE
FOR ELECTRICAL DISCHARGE TUBES
Wolfgang Nestler, Munich, Germany, assignor to Siemens
Aktiengesellschaft, Munich, Germany, a corporation of
Germany
Filed July 5, 1966, Ser. No. 562,769
Claims priority, application Germany, July 5, 1965,
S 97,996
Int. Cl. H01j 1/20, 19/06, 19/14
U.S. Cl. 313—346                                    7 Claims

ABSTRACT OF THE DISCLOSURE

In an indirectly heated capillary cathode employing alkaline earth oxides, as emission material in combination with an additional metal oxide present in an amount of approximately 10% by weight, said additional oxide being one which has no contaminating effect with respect to the cathode, does not promote barium for emission and is one which is capable of combining with additional oxygen and thereby capable of reducing any barium hydroxide, which has been created prior to the initiation of the supply operation, to barium oxide, in particular $Ce_4O_7$, $WO_2$, $VO_2$, $V_2O_3$.

---

The invention relates to a cathode for electrical discharge vessels, in the operation of which emission substances pass from a storage supply through fine apertures of a porous emission substance carrier made of especially porously sintered high-melting metal, such as, for example tungsten, covering the supply of emission substances and providing the means for supplying the cathode surface, in which the supply substances consist essentially of alkaline earth oxides, particularly barium oxide.

Alkaline earth metal oxides are utilized instead of corresponding carbonates because of the well known appreciable disadvantages of the carbonates which appear especially in the necessary treatment processes, for example, at the high vacuum pump or at the corresponding automatic devices.

The difficulties arising in the use of alkaline earth metal oxides, especially of barium oxide, are likewise well known, especially with respect to atmospheric influences. The access of moisture to the barium oxide must, therefore, be avoided, not only in the production and introduction of a supply, but especially too, in the storage of the cathode in question and during their installation in a discharge vessel. Since this is never assured, more or less barium hydroxide is always formed, which is subsequently decomposed, during the exhausting of the cathode, i.e., during the exhaust pumping process of the respective tube, into barium oxide and water only very slowly and incompletely. The barium hydroxide tends to melt in the hydrate water in a foaming manner and which clogs the porous emission material carrier disk, but of primary importance, the water set free at high temperature oxidizes the emission material carrier layer and in this manner leads to the contamination of the cathode. Therefore, widely divergent measures have been utilized for the avoidance of the enumerated difficulties. For example, one has sought to meet the absorption of moisture by barium oxide—of course only in a very limited proportion—by the utilization of mixed oxides instead of pure barium oxide. Such mixed oxides, following absorption of moisture, initially decompose in the vacuum at increasing temperature before they melt so that, in this case, at least no melted material passes through the pores of the emission material carrier layer. Irrespective of this feature, the necessary, above described disadvantages caused by the moisture continue to exist, for which reason every effort is made to strictly avoid moisture in tubes. Moreover, the barium component which can be accommodated in a defined volume may, in this case, be considerably smaller than for pure BaO so that at equal evaporation rates, a shortening of the useful life results.

In another known supply cathode, in addition to reduction agents, there is added to the supply consisting of, among others, barium oxide, acid forming oxides, such as beryllium oxide, zirconium oxide, titanium oxide, silicium oxide, aluminum oxide and zinc oxide, which are present in such a considerable surplus that at the highest temperatures occurring in the supply container, no melting of the supply occurs in any event. In addition thereto, the added oxides mentioned are supposed to prevent the barium oxide of the supply substance from being affected by the atmosphere. The essential disadvantage of this known measure consists, above all, of the fact that, as is readily apparent, the protection through the added oxides against atmospheric influences, even with an ample surplus, is completely insufficient and that, in addition thereto, such a surplus requires either a considerably larger supply container and, with it, correspondingly larger cathode dimensions which has an unfavorable effect with regard to the economy and the characteristics of the electrical discharge vessel involved, in particular vessels for UHF operation, or influences the useful life as well as the operating structure of the particular discharge vessel in an unfavorable manner.

But the addition of other known metal oxides, in order to form relatively unreactive mixed crystals along with the barium oxide also has, among others, the essential disadvantage that they are more difficult to reduce so that the subsequent barium delivery is often too small or is not controllable. In such cases, the inclusion of special reduction agents would additionally be required.

It is, therefore, the purpose of the invention to produce a supply cathode, in particular a metal capillary cathode with a supply of alkaline earth metal oxides, in particular barium oxide, which will deliver barium during the operation, without the disturbing influences caused by moisture, in particular from the atmosphere, and without the existance of the disadvantages occurring in connection with the measures previously employed.

This is achieved in an indirectly heated cathode for electrical discharge vessels in which, during operation, emission substances migrate from the emission material supply through fine openings of a porous emission material carrier covering such supply, said carrier in particular to consist of a high melting metal, for example, tungsten, suitably sintered to form a porous structure with the carrier substance flowing toward the cathode surface. In this cathode the supply material which delivers barium during operation consists of alkaline earth metal oxide to which a further metal oxide has been added, according to the invention by the feature that at least one metal oxide, capable of combining with additional oxygen (hereinafter termed "low metal oxide"), is included, such oxide to have no contaminating effect with respect to the cathode and to be able to reduce any barium hydroxide created prior to the initiation of the supply operation. The oxide may be selected from $Ce_4O_7$, $WO_2$, $VO_2$, $V_2O_3$ and the like, being added to the supply, preferably in fine distribution.

Thus, through the addition of such a low metal oxide to the barium oxide, barium hydroxide which has come into being during the synthesis is reduced to barium oxide. The hydrogen which has been liberated during the reduction is pumped off without the formation of free barium, regardless of how much of the metal oxides was added to the barium oxide and how much water was absorbed by the barium oxide. If instead of the cited low metal oxides, other customary reduction agents, for example, metals like aluminum or magnesium, were added, an eventual surplus of metallic barium would be freed. This barium portion which would be free in addition to the barium of the normal subsequent delivery process, would evaporate from the cathode and, for example, be deposited on the grid whereby the discharge characteristics would be altered and the useful tube life would be correspondingly reduced. Another reason to avoid an excess barium formation as much as possible is the occurring deterioration of insulation values by the vaporizing of barium upon the insulating parts, in particular upon the walls of the discharge vessel.

In an especially advantageous manner, the addition is selected to amount approximately to 10% by weight. If necessary, such addition may be further reduced somewhat if the supply substance is advantageously produced in a compact shape, for example, as a tablet or pellet.

Specific details of the invention are explained by an example of construction, illustrated purely schematically in the figure, in which those parts which do not necessarily contribute to the understanding of the invention have been omitted or have not been identified.

In the example of construction illustrated, partially broken away in cross section, the reference numeral 1 designates a pot-shaped supply container, surrounded by a cathode casing 2. Such container is covered at its open end by an emission material carrier 3 of, for example, tungsten, suitably sintered to form a porous structure, and tightly connected with the container at the flange 4. The supply 5 which consists of alkaline earth oxide, in particular of barium, to which approximately 10%, by weight, of at least one low metal oxide, such as $Ce_4O_7$, $WO_2$, $VO_2$, $V_2O_3$ or the like, is added in fine distribution. For the reduction of the surface and with it of the absorption centers, advantageously the supply substance can still be formed into compact shape, for example, into the shape of a pellet or tablet so that the addition of low metal oxide may still be reduced although this addition does not have any disadvantageous influence upon the decomposition of the supply. A screen 6 of tungsten wire prevents a direct contact between the emission material carrier and the supply substance and, in addition, promotes more uniform distribution of the emission promoting substance. The deescribed cathode has a relatively simple structure of the supply and distinguishes itself by a long, useful life. In addition to this, disadvantageous effects on other electrodes are very much reduced.

Changes may be made within the scope and spirit of the appended claims which define what is believed to be new and desired to have protected by Letters Patent.

I claim:
1. In an indirectly heated cathode for electrical discharge vessels in which, during operation, emission substances from an emission material supply migrate, through fine openings of a porous emission material carrier covering such supply, made of a high melting metal, such as tungsten sintered to form a porous structure, toward the cathode surface and in which cathode the supply material which delivers barium during operation comprises alkaline earth metal oxide to which a further metal oxide is added, the combination of at least one low oxide substance capable of combining with additional oxygen, which does not promote barium for emission, which has no contaminating effect with respect to the cathode and which is capable of reducing any barium hydroxide, which has been created prior to the initiation of the supply operation, to barium oxide.

2. A cathode according to claim 1, wherein the addition of low oxide substance amounts to approximately 10% by weight.

3. A cathode according to claim 1, wherein the emission material supply is in the form of a pellet or tablet.

4. A cathode according to claim 1, wherein said low oxide substance comprises a substance selected from the class consisting of $Ce_4O_7$, $WO_2$, $VO_2$, $V_2O_3$, which is added in finely distributed form to the emission supply material.

5. A cathode according to claim 4, wherein said emission supply material comprises barium oxide.

6. A cathode according to claim 4, wherein the addition of low oxide substance amounts to approximately 10% by weight.

7. A cathode according to claim 4, wherein the emission material supply is in the form of a pellet or tablet.

References Cited

UNITED STATES PATENTS

| 2,722,626 | 11/1955 | Coppola et al. | 313—346 |
| 2,848,644 | 8/1958 | Koppins | 313—346 |
| 2,925,514 | 2/1960 | Lemmens et al. | 313—346 |

FOREIGN PATENTS

| 929,002 | 6/1963 | Great Britain. |
| 983,159 | 2/1965 | Great Britain. |
| 1,274,550 | 9/1961 | France. |
| 1,132,256 | 6/1962 | Germany. |

JOHN W. HUCKERT, *Primary Examiner.*

A. J. JAMES, *Assistant Examiner.*

U.S. Cl. X.R.

313—337